US011070159B2

(12) United States Patent
Williams (10) Patent No.: US 11,070,159 B2
(45) Date of Patent: Jul. 20, 2021

(54) MULTI LANE MOTORS

(71) Applicant: TRW Limited, Solihull (GB)

(72) Inventor: Connel Brett Williams, Leamington Spa (GB)

(73) Assignee: ZF Automotive UK Limited

( * ) Notice: Subject to any disclaimer, the term of this patent is extended or adjusted under 35 U.S.C. 154(b) by 8 days.

(21) Appl. No.: 16/529,354

(22) Filed: Aug. 1, 2019

(65) Prior Publication Data

US 2020/0044595 A1    Feb. 6, 2020

(30) Foreign Application Priority Data

Aug. 2, 2018 (GB) ..................................... 1812587

(51) Int. Cl.
| | |
|---|---|
| *H02P 25/22* | (2006.01) |
| *H02P 21/05* | (2006.01) |
| *H02P 21/18* | (2016.01) |
| *H02P 27/12* | (2006.01) |

(Continued)

(52) U.S. Cl.
CPC .............. *H02P 25/22* (2013.01); *H02P 21/05* (2013.01); *H02P 21/18* (2016.02); *H02P 21/22* (2016.02); *H02P 27/12* (2013.01); *B62D 5/0403* (2013.01); *H02P 2207/05* (2013.01)

(58) Field of Classification Search
CPC ...... H02P 29/028; H02P 27/12; H02P 25/022; H02P 21/05; H02P 21/22; H02P 21/18; H02P 6/08; B62D 5/04
See application file for complete search history.

(56) References Cited

U.S. PATENT DOCUMENTS

| | | | | |
|---|---|---|---|---|
| 5,880,550 | A | * | 3/1999 | Fukao ................. F16C 32/0444 310/179 |
| 6,078,119 | A | * | 6/2000 | Satoh .................. F16C 32/0444 310/179 |
| 10,833,557 | B2 | * | 11/2020 | Severson ................ H02P 25/22 |

(Continued)

FOREIGN PATENT DOCUMENTS

WO    2017145797 A1    3/2018

OTHER PUBLICATIONS

Patents Act 1977: Search Report under Section 17(5), Application No. GB1812587.2, dated Jan. 29, 2019.

*Primary Examiner* — Said Bouziane
(74) *Attorney, Agent, or Firm* — Robert James Harwood (57) ABSTRACT

A motor apparatus comprises a permanent magnet synchronous motor circuit having a plurality of lanes, each lane comprising a plurality of unbalanced phases. A current demand circuit which receives a torque demand signal having a value equal to the torque that is to be generated by the motor apparatus and generates a respective current demand signal for each lane indicative of the current to be applied to each phase of the lane to achieve the demanded torque. A first drive circuit and a second drive circuit each comprise a plurality of switches which selectively connect the phases of a respective one of the plurality of lanes to a supply such that PWM modulated currents flow in each of the phases that correspond to the demanded current. The current demand circuit is adapted to modify one or both of the current demand signals such that one or both lanes additionally generate a set of radial forces that are applied to the rotor of the motor that do not net to zero.

10 Claims, 9 Drawing Sheets

(51) Int. Cl.
*H02P 21/22* (2016.01)
*B62D 5/04* (2006.01)

(56) References Cited

U.S. PATENT DOCUMENTS

| | | |
|---|---|---|
| 2013/0320905 A1 | 12/2013 | Uryu |
| 2015/0069949 A1 | 3/2015 | Mohammadpour et al. |
| 2018/0180095 A1* | 6/2018 | Jastrzebski ......... F16C 32/0497 |
| 2018/0354549 A1 | 12/2018 | Tsubaki |

* cited by examiner

Figure 11

MULTI LANE MOTORS

CROSS-REFERENCE TO RELATED APPLICATIONS

This application is a national stage of Great Britain Patent Application No. 1812587.2, filed 2 Aug. 2018, the disclosures of which are incorporated herein by reference in entirety.

BACKGROUND TO THE INVENTION

This invention relates to improvements in multi-lane permanent magnet synchronous electric motors.

A permanent magnet synchronous motor PMSM comprises a stator comprising a set of teeth around which phases windings are wound in a defined pattern. Three phases are typical, the set of phases forming a lane. A rotor having a set of permanent magnets is arranged concentrically around the stator, or inside the stator. By applying AC drive currents to the phases, a magnetic field is produced which will rotate around the stator. The flux of the permanent magnets on the rotor interacts with this rotating magnetic field causing the rotor to rotate in synchronism with field. By synthesizing the AC currents from a DC supply using a pulse width modulation technique, the speed and torque of the motor can be carefully controlled.

The AC current are typically provided by connecting each phase of the motor stator to a drive circuit that includes one or more switches that selectively connect the phase to a positive or negative or ground supply rail. The opening and closing of the switches is controlled by a control circuit, and by choosing an appropriate PWM pattern to open and close the switches it is possible to produce the required rotating magnetic field. A current controller receives a current demand signal and from this produces appropriate current waveforms that are applied to the switches of the drive circuit. The demand signal is generated upstream by a current demand circuit that receives a torque demand signal representing the torque demanded from the motor. The conversion of torque to current is typically performed using a look up table due to non-linearity in the relationship between the motor torque and the current in the windings.

PMSM motors a commonly used in electric power steering systems for vehicles. In an electric power steering system, the electric motor applies assistance torque to a part of the steering mechanism that helps a driver to turn the steering wheel. This has been proven to be a more efficient system than a traditional hydraulic steering system, and also brings additional benefits such as the ability to provide additional driven assistance functionality and being relatively simple to tune by a manufacture to give different steering feels using only modifications to software.

Applications such as electric power steering are safety critical, as a fault in the steering leading to a total loss of assistance could surprise a driver. It is therefore known to provide PMSM motors which have a plurality of lanes. A lane in the context of this description, and as commonly understood in the art, comprises a set of phase windings, a drive circuit which applies the current waveforms to each phase of the lane by selectively connecting the phase to an electrical supply, and a current controller that generates the required PWM patterns for the switches of the drive circuit in response to a received current demand signal. In a dual-lane motor, there are two lanes.

In a fully independent system, each lane has a drive circuit and a control circuit which is completely independent of the drive circuit and control circuit for the other lane. In another arrangement, each lane may have its own drive circuit but the two lanes may share a common control circuit. In the context of this description, both arrangements fall within the scope of the term multi-lane PMSM motor having a plurality of lanes. Dual lane motors are becoming widely used. With more than two lanes there is, of course, a higher degree of fault tolerance but the principle of one lane providing a backup for one or more other lanes, or being able to share torque generating duties with other lanes, remains the same.

A PMSM motor having a plurality of lanes can be operated in a variety of different ways. A subset of multiple lanes may be used to drive the motor in normal use with the other remaining lane or lanes carrying no current and taking no part. If there is a fault in a lane that is normally used, it may be turned off and the other remaining lanes used to drive the motor. In an alternative with a motor with two or more lanes, all lanes may be driven in normal use and in the event that one is faulty the motor may continue to run using the remaining non-faulty lanes, albeit at reduced torque levels. There are some benefits in using all lanes in normal use, including the ability to reduce the power ratings of the switches in each lane as the peak torque each lane must deliver is lower than it would be if only one lane was required all the torque in normal operation.

Figure 1:
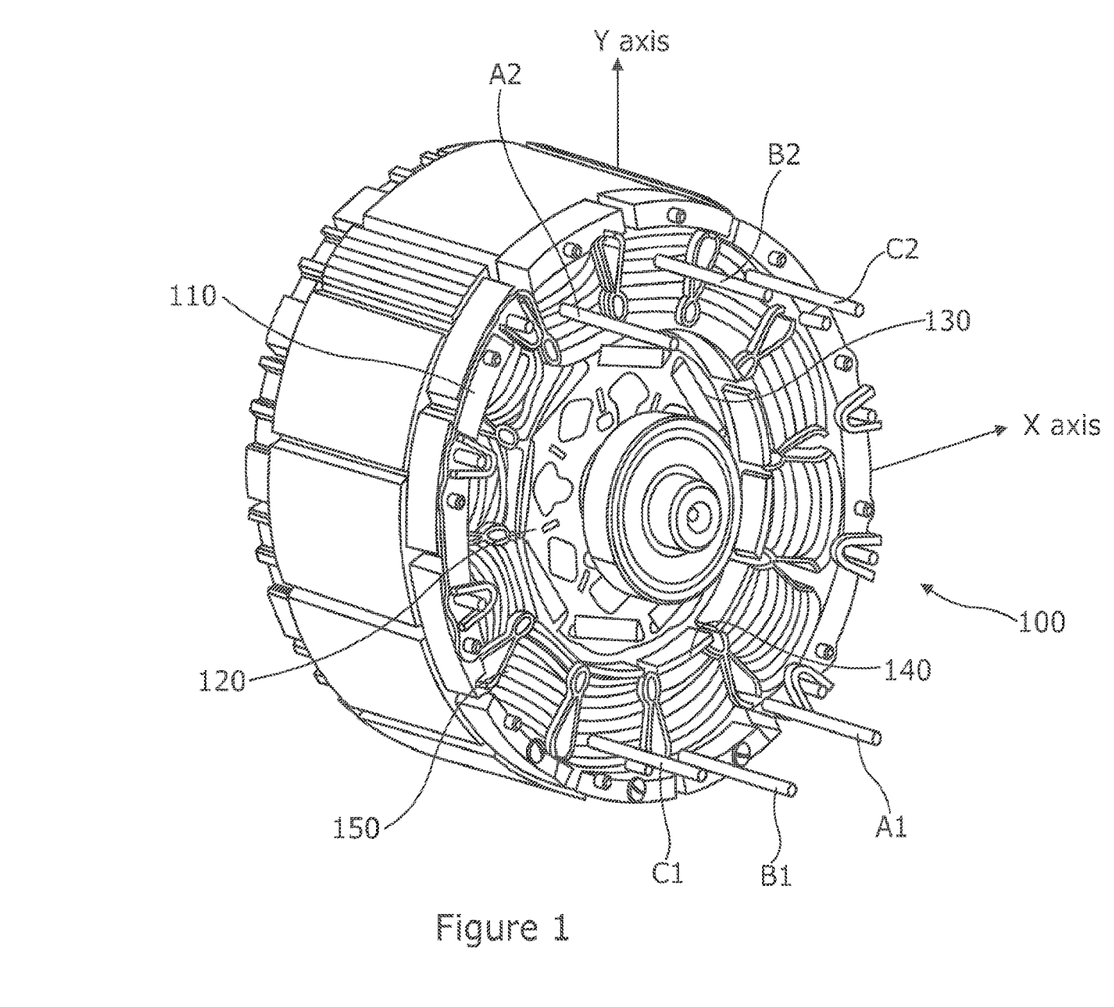
FIG. 1 is a perspective view of a dual-lane PMSM motor that may form a part of a motor apparatus in accordance with at least one aspect of the present invention.

In a typical PMSM motor, each lane comprises a set of windings that are wound around teeth that are spaced around the motor stator. The windings and teeth can be arranged in a number of different ways. In a balanced winding arrangement the teeth around which parts of a continuous length of conductive wire are wound are arranged in pairs where the teeth are diametrically opposed. In an unbalanced wound motor there are at least two teeth that are wound with a continuous length of conductive wire that are not diametrically opposed. FIG. 1 shows an exemplary unbalanced winding motor.

In a balanced motor, the radial forces applied to the rotor when a current passes through the phase net to zero, as each of the winding around the opposed teeth generate opposing radial forces at the rotor. Figures show two different arrangements of balanced motor. Provided the teeth and number of turns of winding are the same these forces will perfectly cancel out. If all phases are balanced, then the radial force on the rotor will always net to zero regardless of what currents are applied to the phases.

The term unbalanced lane in the context of this description should be construed as meaning a lane which comprises a set of phases where a current passing through at least one of the phases of the lane generates a net radial force at the rotor.

With an unbalanced motor as shown in FIG. 1, each phase winding can generate a net radial force on the rotor when current flows in the phase winding. This is possible because the flux generated by the windings of a lane creates radial forces that do not cancel themselves out.

Both balanced and unbalanced winding arrangements are commonly used, and an unbalanced arrangement can be used without generating an undesirable net radial force on the rotor by careful selection of the combination of currents flowing in all of the phases of a lane at a given time so that the sum of all of the radial forces generated by each phase nets to zero. In the case of the motor of FIG. 1, for example, driving both lanes with the same current waveforms will produce no net radial forces on the rotor as the radial forces all cancel out.

SUMMARY OF THE INVENTION

According to a first aspect the invention provides a motor apparatus comprising:

a permanent magnet synchronous motor circuit having a plurality of lanes, each lane comprising a plurality of unbalanced phases, a current demand circuit which receives a torque demand signal having a value equal to the torque that is to be generated by the motor generates a respective current demand signal for each lane indicative of the current to be applied to each phase of the lane to achieve the demanded torque, a first drive circuit which comprises a plurality of switches which selectively connect the phases of a first of the plurality of lanes to a supply such that PWM modulated currents flow in each of the phases that correspond to the demanded current, a second drive circuit which comprises a plurality of switches which selectively connect the phases of a second of the plurality of lanes to a supply such that the PWM modulated currents flow in each of the phases that correspond to the demanded current, in which the current demand circuit is adapted to modify one or both of the current demand signals such that one or both lanes additionally generate a set of radial forces that are applied to the rotor of the motor that do not net to zero.

Where the plurality of lanes comprises three or more lanes, there may be additional drive circuits, one for each lane, which each comprise a plurality of switches which selectively connect the phases of a respective one of the plurality of lanes to a supply such that PWM modulated currents flow in each of the phases that correspond to the demanded current, and in that case the current demand circuit may be adapted to modify one or more of the current demand signals such that one or more of the plurality of lanes additionally generate a set of radial forces that are applied to the rotor of the motor that do not net to zero.

The applicant has appreciated that in a multiple (two or more) lane motor radial forces can be generated by applying difference currents to the phases of two or more of the lanes if the lanes are each unbalanced. In this way it is possible to generate controlled radial forces in addition to the standard rotational force, which may provide a wide range of benefits.

The skilled person will appreciate that the motor should be configured such that the two or more motor lanes, when driven with appropriate current waveforms for each phase, can work together to generate any torque over an operating range from maximum negative torque to a maximum positive torque without generating a net radial force at the rotor. This allows the motor to operate smoothly when driven with an unmodified current demand signal. This can be achieved by both lanes being unbalanced, yet with the two lanes being configured to produce opposing radial forces when driven with appropriate current waveforms so that the required radial forces can be generated. A simple rule for producing an unbalanced lane is to provide n−2 poles on the stator for the lane, where n is the number of rotor poles. Where there are two lanes, this will mean that there should be 2(n−2) poles on the stator in total.

An exemplary motor layout that meets the requirements of the preceding paragraph may comprise for each lane three phases A, B and C, with a stator teeth that is wound for phase A of the first lane each being diametrically opposite to a stator tooth wound for the corresponding phase A, B or C of the second lane.

In a most convenient motor layout the motor is a dual lane motor meaning it has two lanes.

The motor may comprise twelve teeth, with the first lane comprising windings around half of the teeth and the second lane comprising windings around the other half of the teeth.

Each phase may comprise a continuous conductive wire that is wound around two teeth that are not diametrically opposed.

The first lane may comprise windings around teeth that are located in one half of the motor and the second lane may comprise windings around teeth that are located in the other half of the motor. By a half of the motor we mean a portion of the motor stator that extends around 180 degrees of the circumference of the stator.

The set of windings and teeth of the first lane may have identical properties to the set of windings and teeth of the second lane so that for a given set of drive currents in the phases each lane will produce the same torque, but the relative positions of the teeth and windings of each lane must be offset as set out above such that each lane produces identical but offset radial forces. In this way, the radial forces from the two lanes will net to zero if the value of the current demand for each lane is the same. This is convenient as it simplifies the design of the current demand circuit as it is only required to generate one current demand value for each lane.

The current demand circuit may receive at least one radial force demand signal, and may modify the current demand signals as a function of the radial force demand signal.

The current demand circuit may receive two radial force demand signals, one corresponding to a radial force that is required along an X axis and the other to a radial force that is required along a Y axis orthogonal to the X axis. In this frame of reference a Z axis may lie along the axis of rotation of the motor rotor.

The provision of a motor apparatus which can add a radial force to the rotor without altering the torque behavior of the motor enables a range of beneficial motor circuit functionality to be provided.

In one arrangement, the current demand circuit may receive a modulated radial force demand signal that causes the current demand means to modify the current demand signals such that the rotor vibrates at a frequency that is in the range of 10 Hz to 1 khz and with an amplitude that will be perceptible to a person who is in contact with the motor or a component that is attached to the rotor. For example, this may be a steering wheel of an electric power assisted steering apparatus where the motor is used to apply an assistance torque.

The motor apparatus may be configured such that the radial vibration generates an acoustic noise at the motor. Again, this may be within a range which is audible to a person, for instance 20 Hz to 40 KHz.

The current demand circuit may modify the current demand signals by generating for each phase a radial force demand signal that is summed with the unmodified current demand signal.

The current demand signals and the radial force demand signals may comprise signals in the dq frame of reference of the motor.

The current demand circuit may be arranged such that during normal operation of the motor the current demand signals will cause both lanes to apply a torque to the motor whenever the motor torque demand signal is non-zero. Each lane may at any time contribute to a half of the torque demanded from the motor as indicated by the torque demand signal. I.e. equal torques of the same sense are applied from the respective lanes.

Where there are more than two lanes, each lane may generate less than half of the torque. For instance, with three lanes each may contribute one third of the required torque at all times.

Where both lanes (or more than two lanes for a multi-lane motor) contribute to the torque during normal operation, the current demand circuit may modify the current demand signal for the first lane so that the first lane generates an amount of torque in the motor that is reduced by an amount that is equal and opposite to the increase in the amount of torque that is generated by the second lane. This ensures that the modification to the current demand signals has no effect on the overall motor torque generated. A variation in the torque attributable to a lane is an inevitable side effect of producing a radial force using that lane.

In a convenient arrangement, the current demand circuit generates a single radial demand signal that is added to the first current demand signal and subtracted from the second current demand signal.

Alternatively, a single pair of radial demand signals, one for the radial force in along the X axis and the other for the radial force along the Y axis, may be generated and the pair may be added to the first current demand signal and subtracted from the second current demand signal.

In addition to generating a haptic or audible signal, the motor apparatus may be arranged to reduce unwanted motor noise that is caused by radial vibration of the motor. This may occur if the motor is damaged, or if a load connected to the motor is unbalanced. Motors are often connected to gearboxes which can vibrate radially if a gear is damaged.

The motor apparatus may therefore include a detection means which detects radial movement of the rotor, the control circuit modifying the current demand signals such that a force is applied to the rotor by the current flowing in the lanes that partially or completely cancels out the detected radial movement. This may detect the direction and magnitude of the radial movement.

The detection means may comprise an accelerometer fitted to the rotor, or a position sensor that detects the relative position of the rotor and stator of the motor, or some other fixed part of the motor.

The detection means may comprise a microphone which detects noise associated with vibration of the motor.

In a preferred arrangement, instead of providing a physical sensor that adds cost the detection means may comprise an electronic circuit that determines the inductance of each lane using a Sensorless control technique to generate a position estimate for each lane. Such techniques are well known to the person skilled in the art.

The electronic circuit may determine the radial position of the motor rotor relative to the stator by comparing the estimated position determined by the Sensorless technique for the first lane with the estimated position determined by the Sensorless technique for the second lane. Where the estimates are the same the signal processing circuit may determine that there is no net radial force acting on the rotor in the X or Y axis. Where they differ the signal processing circuit may determine that the forces in the X or Y or both X/Y axes are not zero.

The motor apparatus may include a memory which include a lookup table that tabulates pairs of position estimate values with the XY radial position of the rotor.

The electronic circuit may comprise a signal processing circuit embodied by a signal processor that receives one or more input signals from which the back emf, or the inductance, or both the back emf and inductance, of each lane.

In one preferred arrangement, the current demand circuit may modify the current demand signals to generate additional radial forces at the rotor that cancel out vibration of the motor, or may be used to provide a haptic or acoustic feedback signal to a person operating the motor or a mechanism connected to the motor.

According to a second aspect the invention provides a method of driving a permanent magnet synchronous motor having a plurality of lanes comprising:

generating a current demand signal for each lane that is dependent on the torque that is to be generated by the motor, modifying the current demand signals for at least two of the lanes such that the two lanes generate a set of radial forces that are applied to the rotor of the motor that do not net to zero and with the sum of the torque generated by the two lanes corresponding to the torque that would be generated if the current demand signal was not modified, and applying current waveforms to the two lanes in accordance with the modified current demand signals The method may comprise modifying the current demand signals such that the torque applied by one or more lanes increases and the torque applied by one or more of the other lanes decreases by an equal and opposite amount.

The method may comprise driving the motor such that in normal use all lanes make a contribution to the overall torque generated by the motor.

The method may comprise generating at least one radial force demand signal and combining this with the current demand signal to modify the current demand signal.

A radial force demand signal may be generated for forces in the X direction and a radial force demand signal may be generated for forces in the Y direction. In this case, both may be combined with the current demand signal to produce the modified demand signal.

The current demand signal from one lane may be modified by subtracting the radial force demand signals or signals, and for the other lane may be modified by adding the radial force demand signal or signals.

The motor may comprise a part of a motor circuit as described in relation to the first aspect of the invention.

According to a third aspect the invention provides a method of detecting a radial vibration in a motor circuit or a mechanical load driven by a permanent magnet synchronous motor of the kind having a plurality of lanes in which each lane of the motor is unbalanced, the method comprising:

estimating the angular position of the rotor using a Sensorless position measurement technique for at least two lanes to produce respective independent estimates of the rotor position, and estimating the radial position of the motor from the differences between the estimates, and monitoring changes in the estimated radial position of the rotor over time to identify the vibration.

Position estimates may be produced for every lane of the motor.

It is known that a fault in a motor or a load, such as a gearbox, will often present itself as a vibration of the motor rotor. The applicant has appreciated that using a multi-lane motor, especially a relatively simple dual-lane motor and comparing angular position estimates from each lane, it is possible to monitor the radial movement of the rotor and from this detect the vibrations that are characteristic of a fault.

The method may therefore comprise identifying a fault in a load attached to the rotor of the motor by an additional step of correlating the identified vibration with a known signature pattern of vibration corresponding to a fault at the load.

The applicant has appreciated that a faulty component is likely to generate a vibration with a unique signature, in particular corresponding to a resonant frequency of a part of the load that is faulty, and by identifying the signature vibration the precise part of the load that is at fault may be identified.

The method may comprise using any known Sensorless position measurement technique. In a simple technique, a shunt resistor may be provided in the DC link path of each lane of the motor and the current flowing through the shunt resistor may be measured at predefined sample times where the pattern of current in the phases of each lane meet special criteria.

From the currents measured at the shunt resistor, the inductance of the motor can be estimated, and since it is known that inductance varies with rotor position the rotor position can hence be determined. Where there are two lanes, any radial movement will cause a differential change in the estimates for each lane which can be detected as a difference.

In an alternative the back emf of each lane may be measured instead of the inductance.

The method may comprise generating angular position estimates for the two lanes that correspond to substantially the same moment in time.

To detect movement in the +Y axis, the back-emf or phase inductance may be compared between a first phase of a first lane that is angularly offset from the Y axis and a first phase of the second lane that is similarly offset from the Y axis and diametrically opposed to the first phase of the first lane. Because the phases are diametrically opposed then an offset in the +Y axis will differentially affect each phase.

To detect movement in the +X axis, the Back-emf or phase inductance may be compared between a first phase of a first lane that is angularly offset from the X axis and a first phase of the second lane that is similarly offset from the X axis and diametrically opposed to the first phase of the first lane. Because the phases are diametrically opposed then an offset in the +X axis will differentially affect each phase.

Other combinations of phases will also enable radial position to be detected. For instance, the back emf of a pair of phases of the first lane may be compared with the back emf of a pair of phases of the second lane. The primary aim is to compare phase variables from both lanes of the motor.

Other advantages of this invention will become apparent to those skilled in the art from the following detailed description of the preferred embodiments, when read in light of the accompanying drawings.

BRIEF DESCRIPTION OF THE DRAWINGS

FIGS. 3(a) and (b) are vector diagrams showing how the torque and radial forces applied to the rotor of a dual lane motor from each lane, whereby the radial forces net to a non-zero value but the radial forces do not alter the net torque generated;

DETAILED DESCRIPTION OF THE INVENTION

As shown in FIG. 1, a dual lane PMSM motor 100 which can be used in an embodiment of the present invention comprises a stator 110 and a rotor 120 arranged concentrically around a common axis. As shown the rotor 120 are inside of the stator 110 but it could be located around the outside of the stator. The motor is also shown schematically in FIG. 10 of the drawings. The invention may be applied to motors with more than two lanes, and the choice of a dual-lane motor for this example should therefore not be construed as limiting the scope of the invention.

The rotor 120 comprises a carrier in which is embedded a plurality of permanent magnets 130. As shown each magnet 130 is located in a slot in the rotor carrier with 8 magnets in total in the exemplary motor.

The stator 110 comprises a plurality of teeth 140 spaced around the stator, each one surrounded by multiple turns of electrical wire 150. There are 12 teeth in total. Each one is wound by wire corresponding to a single phase of a lane of the motor, with lane comprising three phases. In the illustrated motor, the wire for each phase is wound around two teeth of the stator.

The location of the windings of each lane is significant, the motor 100 as shown having unbalanced windings. The motor is unbalanced because each lane has (n−2) poles where n is the number of rotor poles. Each lane has three phases, A, B and C, with the phases of a first lane indicated with a 1, e.g. A1, and of the second lane with a 2, e.g. A2. It can be seen that all of the phase windings for the first lane are on the lower left half of the motor stator, and for the second phase are on the upper right half of the motor. This is important as this ensures that for a given phase, e.g. A1, the windings are wound around teeth which do not form diametrically opposed pairs of teeth. In a single lane motor this would not be acceptable, but with a dual lane motor where both lanes are driven at the same time the resulting radial forces that each lane will apply to the rotor are cancelled out by forces from the other lane.

Other arrangements and numbers or teeth and phases could of course be used within the scope of the present invention to provide unbalanced lanes. For example, there may be more than 2 lanes for even greater fault tolerance, e.g.: 4 lanes. There may be more than 3 phases for each lane, e.g. 5 phase motor. There may be any number of phases where each tooth is controlled by an individual H-bridge. The motor of FIG. 1 is used throughout this description as an exemplary motor, and references to phases and lanes in the following passages refer to the phases shown in the motor of FIG. 1.

Figure 2:
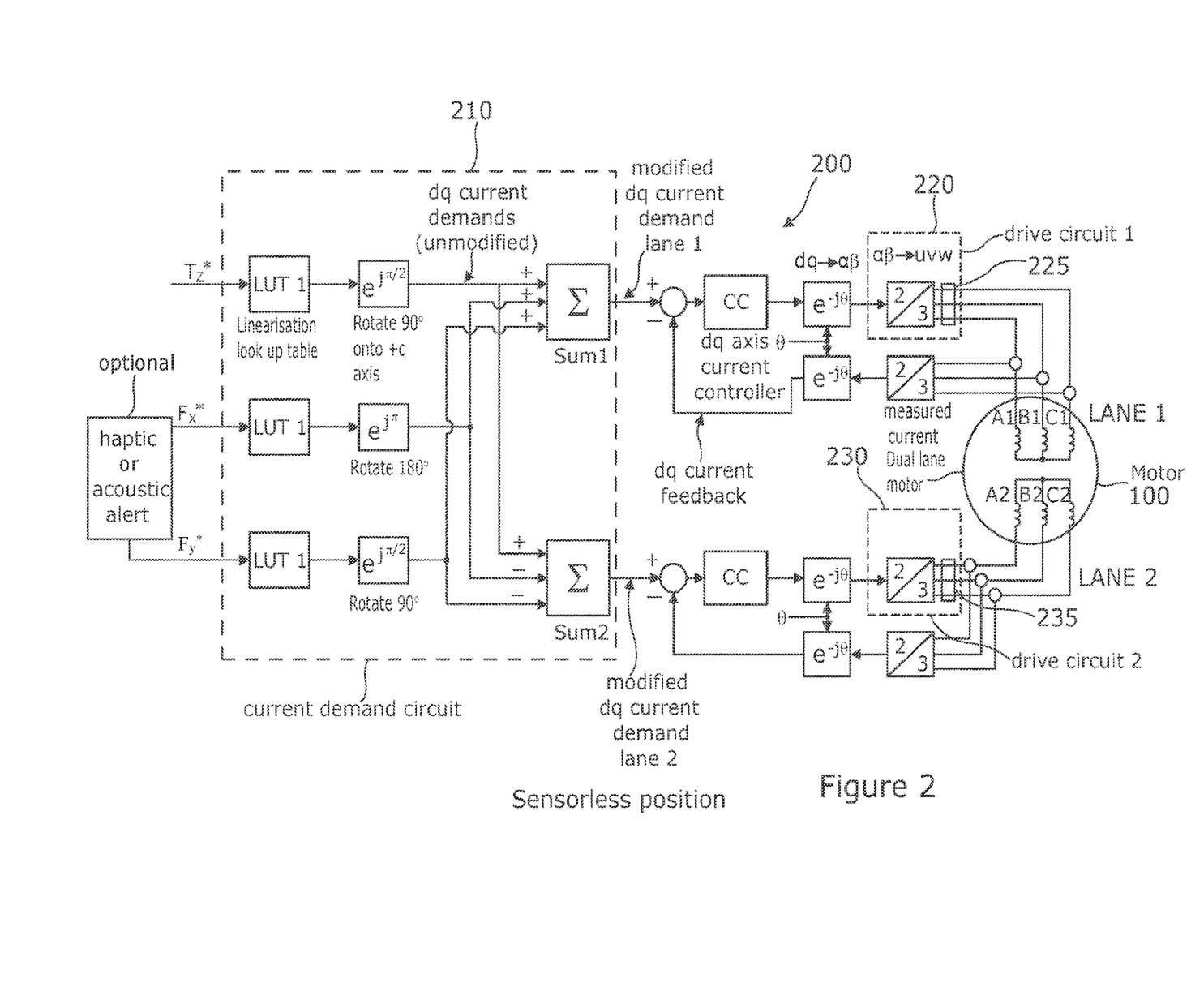
FIG. 2 is a control block diagram of a motor circuit in accordance with at least one aspect on the invention that incorporates a PMSM of the kind shown in FIG. 1.

FIG. 2 is a control block diagram for a first embodiment of a motor apparatus 200 in accordance with a first aspect of the invention.

Current Demand Circuit

As shown the motor apparatus includes a current demand circuit 210 which has an input for a torque demand signal Tz*, having a value equal to the torque that is to be generated by the motor. This may be considered to not be part of the motor apparatus is certain embodiments as the torque demand value may be generated remote from the motor apparatus.

The current demand circuit 210 generates a respective current demand signal for each lane, labeled Lane 1 and Lane 2, indicative of the current to be applied to each phase of the lane to achieve the demanded torque set by the torque demand signal. The current demand circuit 210 receives the torque demand signal. A look up table LUT1 is used to generate the appropriate value for the current demand signal. This may take into account the motor speed and rotor position. The value is then converted into the dq axis as a dq axis current demand signal.

As both lanes are identical, apart from the location of the stator teeth around which the phases are wound, the same current demand signal is used for both lanes to generate the motor torque, with each lane nominally generating one half of the motor torque. As will be explained below, the current demand circuit may, however, modify the current demand signal supplied to each lane to apply a net radial force to be motor rotor without altering the torque.

Figure 11:
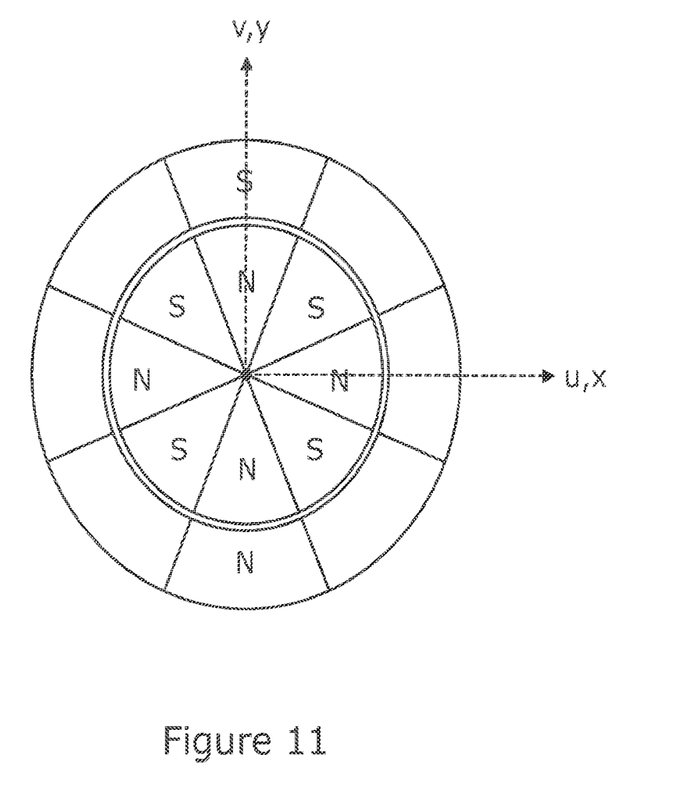
FIG. 11 is an illustration of the principle of radial force generation for a motor having only two stator poles with the rotor aligned with the x axis.

To understand how the invention achieves this effect, a simple motor with only two stator poles is shown in FIG. 11 of the drawings. This shows a simple start position where the x, y axes are aligned to stator reference frame and the u, v axes are aligned to rotor reference frame. The rotor and stator poles generate an interacting pattern of flux that creates a radial force in the +v direction.

Figure 12:
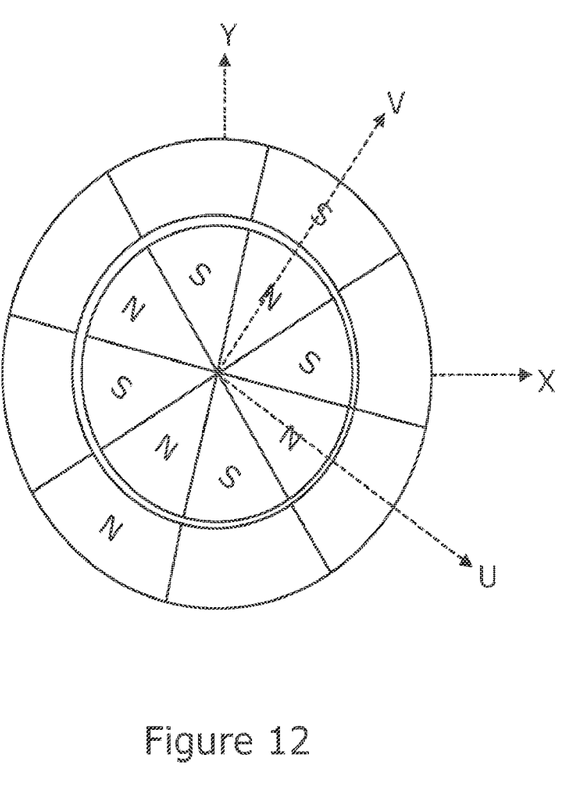
FIG. 12 is an illustration corresponding to FIG. 11 with the rotor having rotated clockwise through 15 degrees.

As the rotor rotates due to an applied torque, the stator current is commutated so that the N&S poles creating the radial force in the +v axis stay Synchronised with rotor and rotate around the stator to a new position as shown in FIG. 12.

The stator poles are aligned with the v axis and thus the radial force in the +v axis is kept constant.

Normally it is desirable to control force on the x and y axes, i.e. in a fixed frame of reference. This can be achieved by modulating the u and v axes such that:

$$u^* = x^* \cos(\theta) + y^* \sin(\theta)$$

$$v^* = -x^* \sin(\theta) + y^* \cos(\theta)$$

Where * indicated demanded force and theta is the rotor electrical angle.

Of course, with a motor with more stator poles the effect is more complex but the principle shown in FIGS. 11 and 12 underpins the present invention.

Motor Drive Circuits

Two motor drive circuits 220,230 are provided, one for each lane of the motor apparatus 200. Both have the same function and they may indeed by identical. A first drive circuit comprises a plurality of switches 225 which selectively connect the phases A1, B1, C1 of a first of the two lanes to a supply such that PWM modulated currents flow in each of the phases that correspond to the demanded current. A second drive circuit 230 comprises a plurality of switches 235 which selectively connect the phases of a second of the two lanes to a supply such that the PWM modulated currents flow in each of the phases that correspond to the demanded current. Prior to each drive circuit is a current controller which receives the demand signal and produces a set of motor phase current waveforms that are used to modulate the switches. The provision of such an arrangement of current controllers and motor drive circuits is well known in the art.

The current demand circuit 200 modifies the current demand signal to produce a respective modified current demand signal for each lane. The modification enables each lane to generate a radial force. This modification is made in response to two force demand signals, one for x axis force (Fx*) and one for y axis force (Fy*) which are input to the current demand circuit 200.

The value of each force demand signal is used to determine a current demand modification value for X and Y forces using two lookup tables LUT2 and LUT3. The resulting values are then converted into d-q axis current demand values for combination with the current demand signal.

The actual modified current demand signals, in the d-q axis, applied to the two lanes, are created by combining the three sets of current demand signals-torque and two radial force signals. The two radial force values in the d/q axis are added at block SUM 1 to the current demand signal to produce a modified current demand signal for the first lane, and subtracted from the current demand signal at block SUM2 to produce the modified current demand signal for lane 2.

The angle and magnitude of current added to lane 1 is therefore subtracted from lane 2 so that the nett torque produced by these radial-force producing currents is zero. In this way the radial force-producing currents can be controlled independently from the torque-producing currents. To avoid generating torque ripple, the vector-sum of the radial-force current in the αβ frame must add up to zero. An example is shown in FIGS. 3(a) and (b) for the two lanes.

Figure 4:
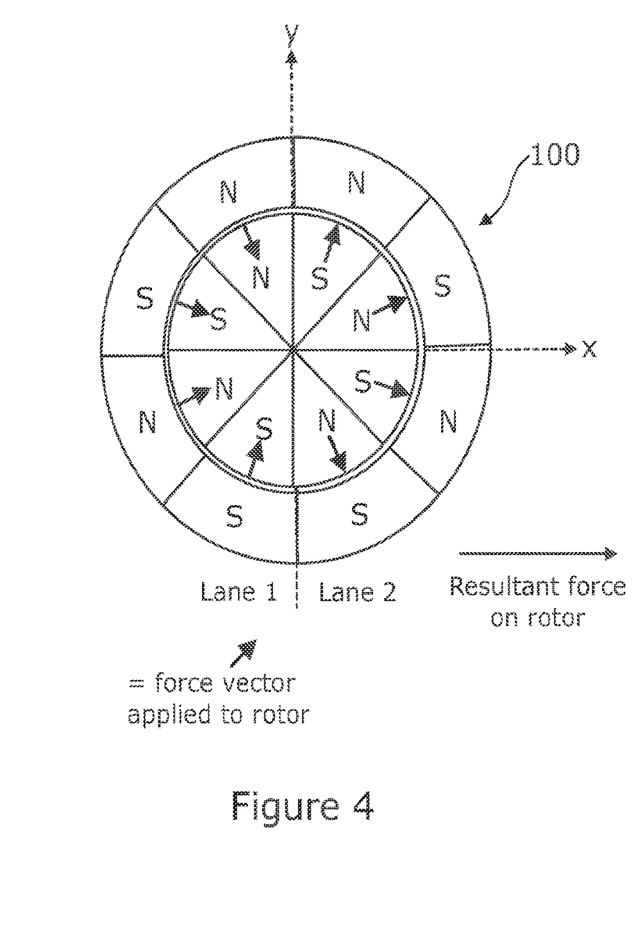
FIG. 4 shows how a radial force can be created along the X axis with the motor rotor at 0 degrees.
Figure 5:
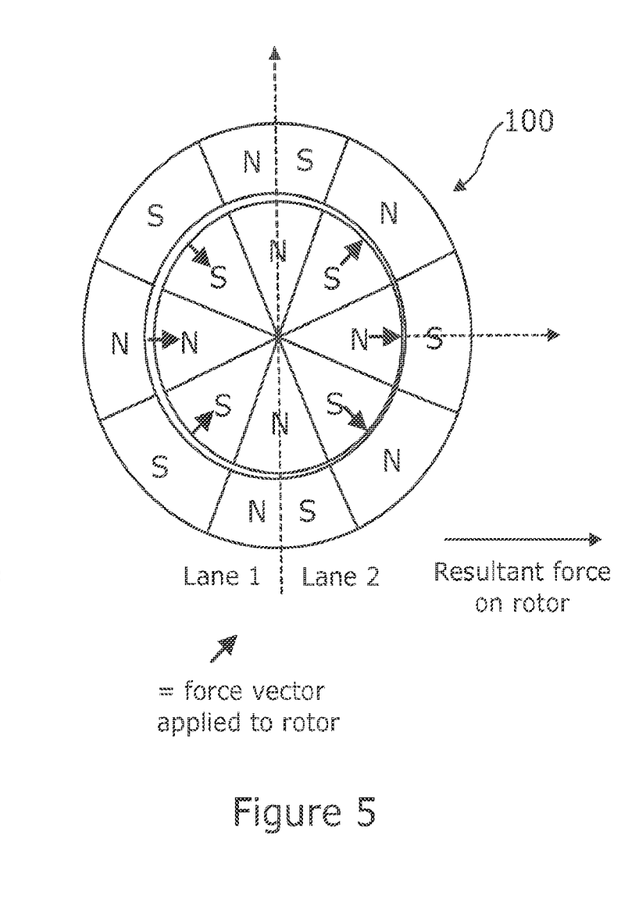
FIG. 5 shows how a radial force can be created along the X axis with the motor rotor having rotated clockwise by 15 degrees.
Figure 6:
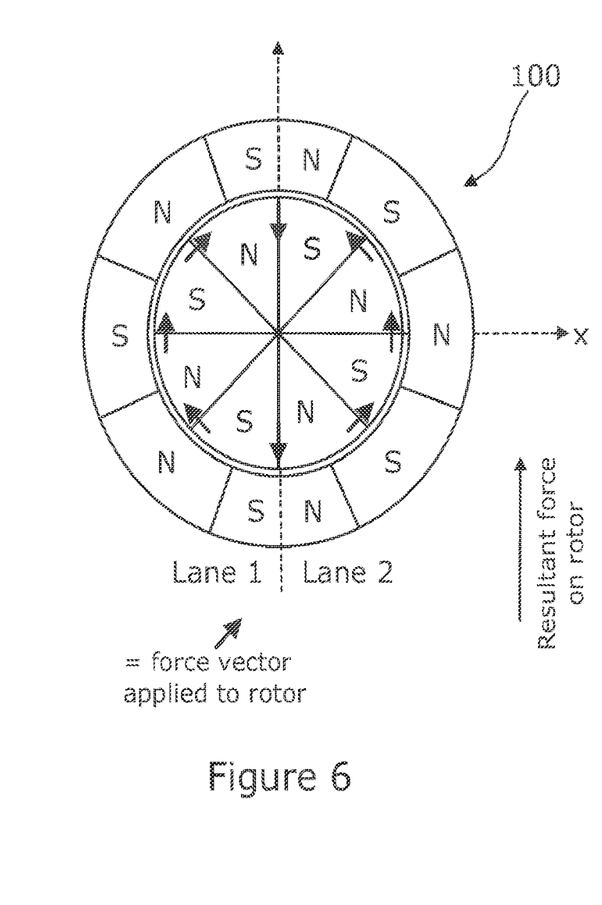
FIG. 6 shows how a radial force can be created along the Y axis with the motor rotor at 0 degrees.
Figure 7:
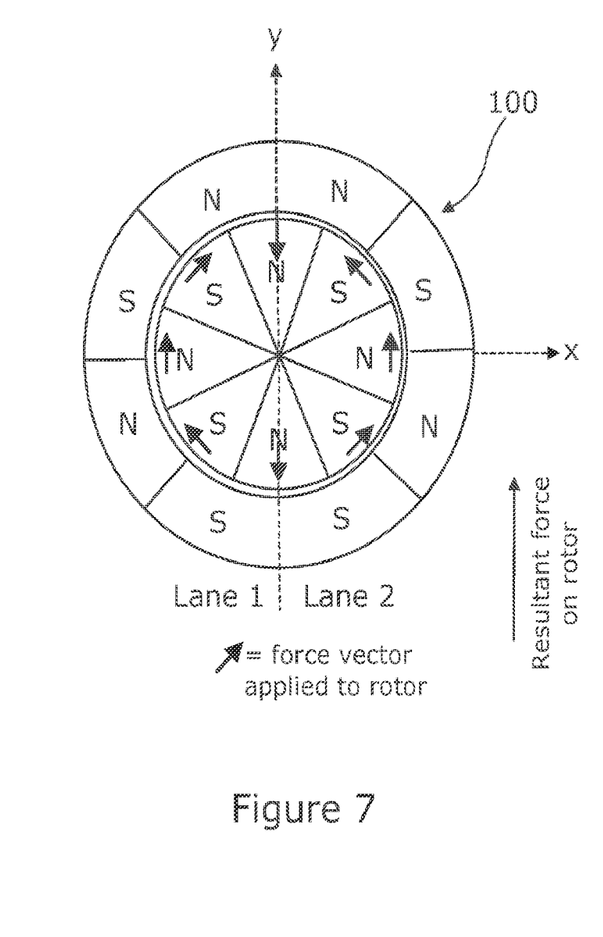
FIG. 7 shows how a radial force can be created along the Y-axis with the motor rotor having rotated clockwise by 15 degrees.

The current demands applied to each lane are therefore the sum of the radial and torque-producing αβ current demands. FIG. 4 shows how force is produced in the x axis with the rotor at 0 deg. The vector sum of radial currents in each lane is zero so there is no nett motor torque produced. FIG. 5 shows how force is produced in the x axis with the rotor rotated clockwise by 15 deg. The vector sum of radial currents in each lane is zero so there is no nett motor torque produced FIG. 6 shows how force is produced in the y axis with the rotor at 0 degrees. The vector sum of radial currents in each lane is zero so there is no nett motor torque produced It can be seen that the radial current vector to produce force in the y axis is 90 degrees (electrical) from the current vector required to produce force in the x axis. As will be seen this is a general rule for any rotor position. FIG. 7 shows how force is produced in the y axis with the rotor rotated clockwise by 15 deg. The vector sum of radial currents in each lane is zero so there is no nett motor torque produced.

As for the rotor position of 0 degrees, it can be seen that the radial current vector to produce force in the y axis is 90 degrees (electrical) from the current vector required to produce force in the x axis. The maximum force capability in the y direction is less than the x direction. This is because there is a counteracting force from the two north poles of the rotor that lie on the y axis producing an opposing force in the −y direction (as shown by the red force vectors).

Figure 8:
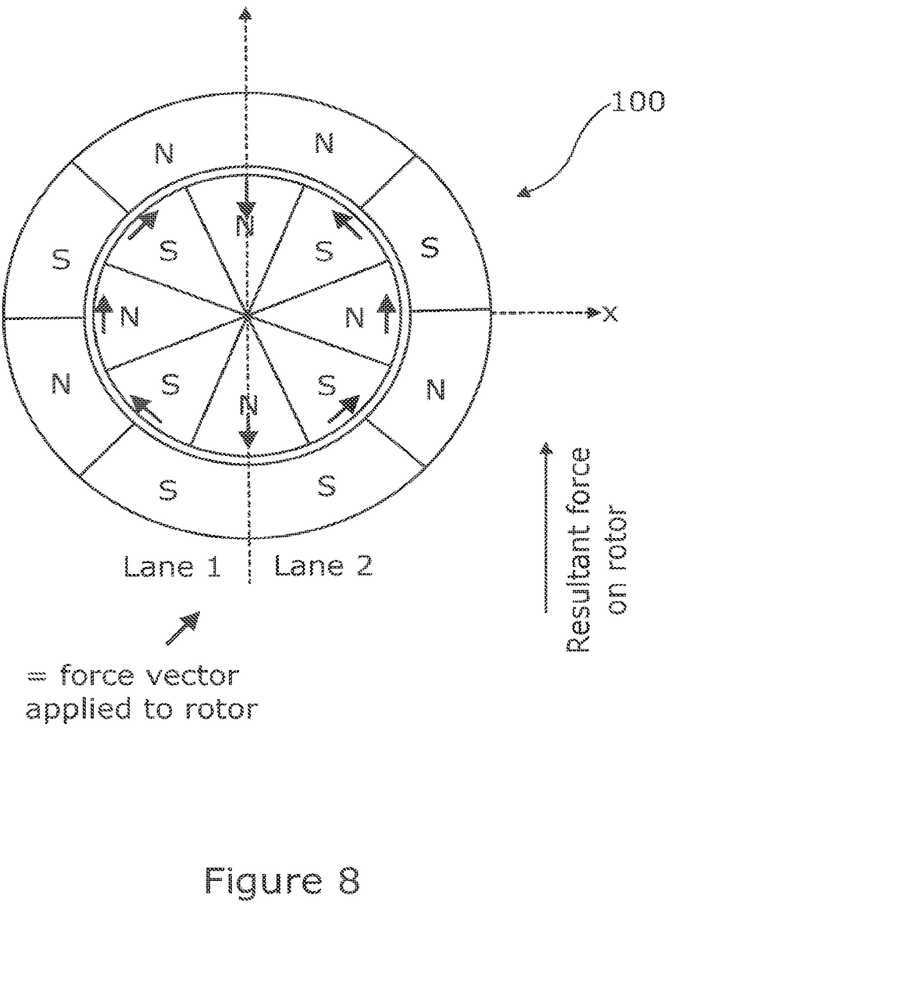
FIG. 8 illustrates the maximum radial force capability of the motor in the y direction is less than in the x direction in the exemplary motor of FIG. 1.

As shown in FIG. 8, the maximum force capability in the y direction is less than the x direction. This is because there is a counteracting force from the two north poles of the rotor that lie on the y axis producing an opposing force in the −y direction (as shown by the force vectors in FIG. 8). The amount of force that can be produced in the y axis depends on the number of rotor poles. The higher the rotor pole number the less of the total rotor circumference producing force against the desired direction. It also depends on the ratio of radial to tangential force produced by an individual tooth as the rotor rotates and this depends in the electromagnetic design, SPM vs IPM etc.

The apparatus of FIG. 2 may be used in a variety of manners by suitable selection of the radial force demand signals. This radial force control has many potential applications. In one application an apparatus within the scope of the first aspect of the invention may be configured to generate haptic feedback to user by vibrating the motor radially. The apparatus in accordance with the first aspect of the invention may additionally or alternatively be configured to generate controlled acoustic feedback to the user. In another arrangement it may be configured to provide active cancellation of vibration/acoustic noise in the motor.

Figure 9:
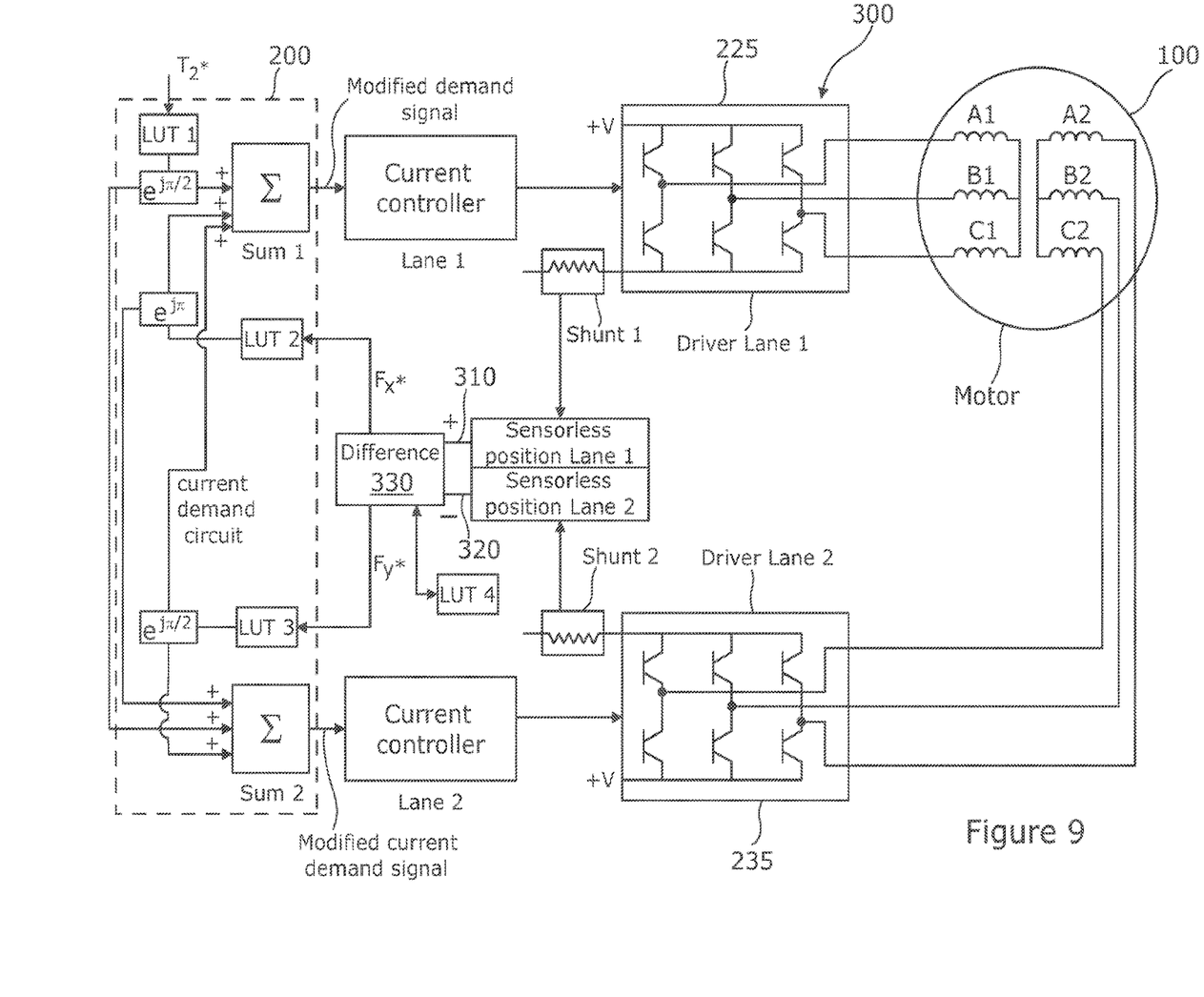
FIG. 9 is a control block diagram of a second embodiment of a motor apparatus in accordance with at least one aspect on the invention that incorporates a PMSM of the kind shown in FIG. 1.

A second embodiment of a motor apparatus 300 is illustrated as a control block diagram in FIG. 9 of the drawings. Where parts are the same as the embodiment of FIG. 2 the same reference numerals have been used for clarity. However, the motor apparatus of the second embodiment includes additional signal processing circuitry for generating the required radial force input values Fx and Fy which enables the motor apparatus to detect radial position of the rotor.

To detect the rotor position, the differential back-emf or differential inductance is detected between the phases in lane 1 and lane 2.

Figure 10:
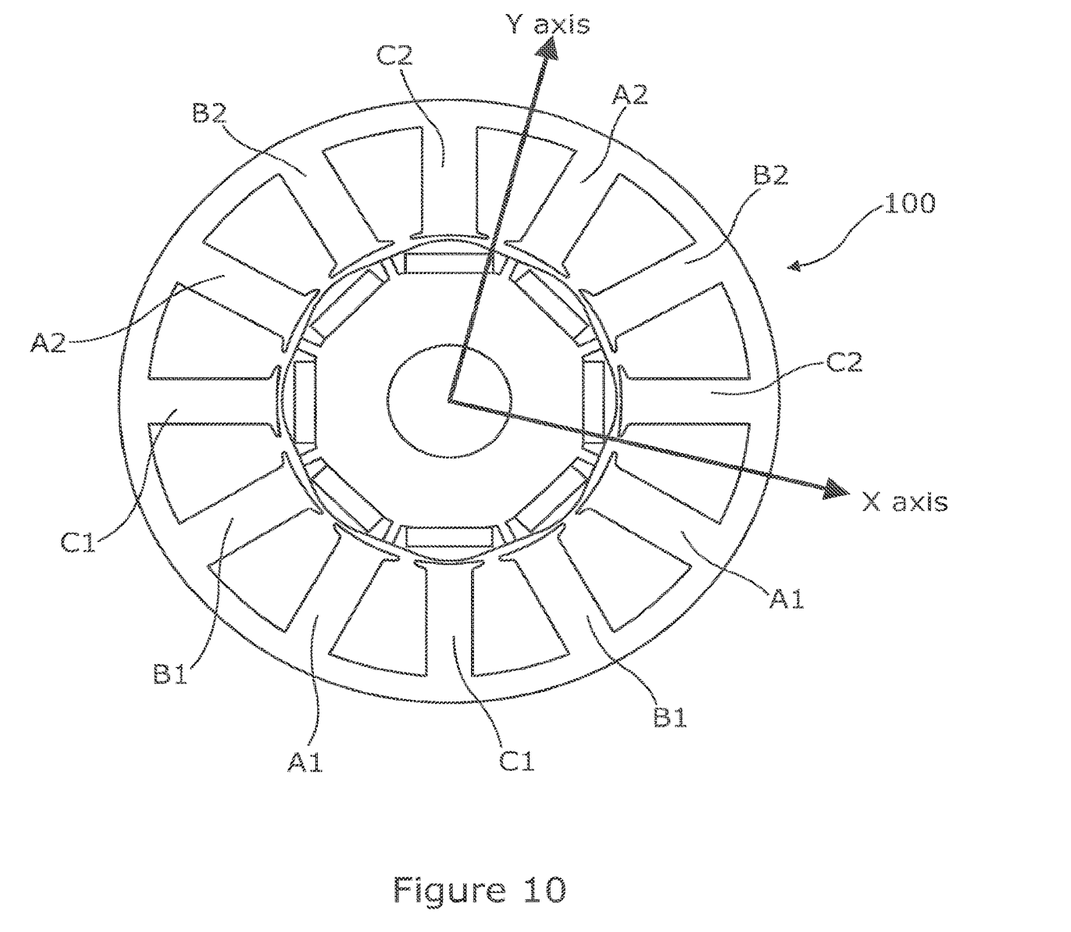
FIG. 10 shows the motor rotor and stator poles of the motor of FIG. 1 and the relative position of the x and y axes and the stator teeth.

To detect movement in the +Y axis for the exemplary motor shown in FIG. 10, the back-emf or phase inductance is compared between phase B2 (phase B in lane 2) and phase B1 (phase B in lane 1) because these phases will be differentially affected by movement in the +Y axis with one increasing as the other decreases.

To detect movement in the +X axis, the Back-emf or phase inductance is compared between phase C2 (phase C in lane 2) combined with A1 (phase A in lane 1) on the one hand and C1 (phase C in lane 1) combined with A2 (phase A in lane 2) on the other hand. Again, the back emfs or phases inductances will be differentially affected by movement in the X axis and this combination will have the highest sensitivity to this movement for this exemplary motor.

Other combinations of will also enable radial position to be detected—the primary aim is to compare phase variables from both lanes of the motor.

At low speeds the signal processing apparatus may compare phase inductance. At high speeds it may compare back-emf.

Detection of Back-Emf or Phase Inductance

To detect the back-emf or phase inductance standard Sensorless techniques from the literature can be employed to estimate the back-emf or phase inductance in the two lanes. By combining this information from the two lanes in the same way as per the radial force control it is possible to determine the displacement in the x and y directions. In a simple arrangement, two sensorless position measurement circuits may be provided, 310,320, with one for each lane. The position estimates produced may then be compared in a difference block 330 and the error used to read out a radial position value from a lookup table LTU4. The table may store pairs of X and Y radial position values which are used to generate the required Fx* and Fy* radial force demand values supplied to the current demand circuit 200. Note that the intermediate step of generating the Fx* and Fy* values which are then fed to the look-up table LUT2 and LUT3 could be omitted and instead LUT4 could directly output the required current demand values.

Figure 3:
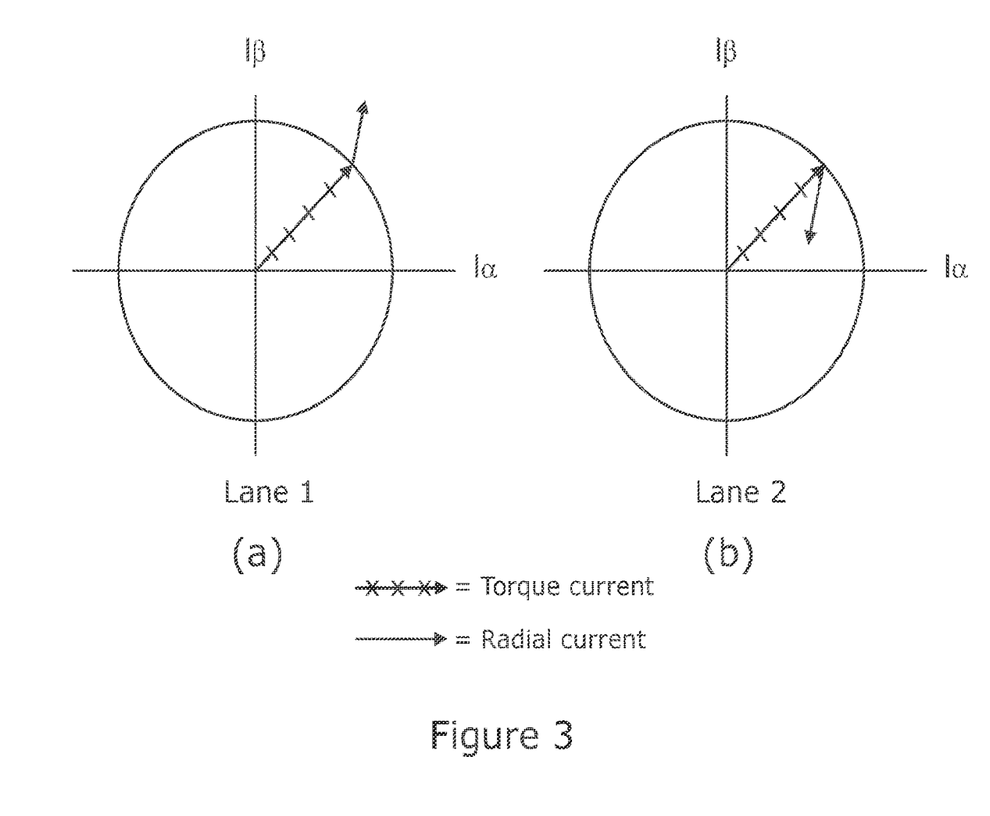

The reader will appreciate that the motor apparatus of FIG. 3 may be used as part of a Predictive Fault Monitoring system. Because radial movement can be measured it is possible to perform one or more of the following:

to detect torsional and/or radial vibration from external perturbations due to degradation of mechanical components. This assumes that the degradation causes a vibration signature that is transmitted to the rotor that is sufficiently large to be detected. This replaces the need for an accelerometer or similar sensor used for fault condition monitoring The apparatus shown in FIG. 3 may also be used to provide Acoustic noise cancellation if the radial vibrations are the source of the noise. By detecting the radial movement, the apparatus may generate appropriate radial force demand signals that cause a radial force to be applied to the rotor that is in antiphase with the noise inducing vibrations, to cancel them out.

This may be especially beneficial in cancelling out radial vibration from external perturbations—e.g. belt noise where the motor drives a belt.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit and scope.

What is claimed is:

1. A motor apparatus comprising:
   a permanent magnet synchronous motor circuit having a plurality of lanes, each lane comprising a plurality of unbalanced phases,
   a current demand circuit which receives a torque demand signal having a value equal to a torque that is to be generated by the motor apparatus and generates a respective current demand signal for each lane indicative of a current to be applied to each phase of the lane to achieve a torque indicated by the torque that is to be generated,
   a first drive circuit which comprises a plurality of switches which selectively connect the phases of a first of the plurality of lanes to a supply such that PWM modulated currents flow in each of the phases that correspond to the current corresponding to the respective current demand signal,
   a second drive circuit which comprises a plurality of switches which selectively connect the phases of a second of the plurality of lanes to a supply such that the PWM modulated currents flow in each of the phases that correspond to the demanded current,
   wherein the current demand circuit is configured to modify one or both of the current demand signals such that one or both lanes additionally generate a set of radial forces that are applied to a rotor of the motor that do not net to zero, and
   wherein the current demand circuit is configured to receive a modulated radial force demand signal that causes the current demand circuit to modify the current demand signals such that the rotor vibrates in a range of 10 Hz to 1 kHz.

2. The motor apparatus according to claim 1 in which a first of the plurality of lanes comprises windings around teeth that are located in one half of the motor apparatus and the second of the plurality of lanes comprises windings around teeth that are located in the other half of the motor apparatus.

3. The motor apparatus according to claim 1 in which the current demand circuit receives at least one radial force demand signal and modifies the current demand signals as a function of the at least one radial force demand signal.

4. The motor apparatus according to claim 3 in which the current demand circuit receives two radial force demand signals, one corresponding to a radial force that is required along an X axis and the other to a radial force that is required along a Y axis orthogonal to the X axis.

5. The motor apparatus according to claim 1 which is configured such that the motor apparatus is caused to move with a radial vibration that generates an acoustic noise at the motor apparatus.

6. The motor apparatus according to claim 1 which further includes detection means which detects radial movement of the rotor, the current demand circuit modifying the current demand signals such that a force is applied to the rotor by the current flowing in the lanes that partially or completely cancels out the detected radial movement.

7. The motor apparatus according to claim 6 in which the detection means comprises an accelerometer fitted to the rotor or a position sensor that detects a relative position of the rotor and a stator of the motor apparatus or some other fixed part of the motor apparatus.

8. The motor apparatus according to claim 6 in which the detection means comprises a microphone which detects noise associated with vibration of the motor apparatus.

9. The motor apparatus according to claim 6 in which the detection means comprises an electronic circuit that determines the inductance of each lane using a sensorless control technique to generate a position estimate for each lane.

10. A method of driving a permanent magnet synchronous motor having a plurality of lanes comprising:
generating a current demand signal for each lane that is dependent on a torque that is to be generated by the motor,
modifying the current demand signals for at least two of the lanes such that the two lanes generate a set of radial forces that are applied to a rotor of the motor that do not net to zero and with a sum of the torque generated by the two lanes corresponding to a torque that would be generated if the current demand signal was not modified, wherein the modifying the current demand signals comprises modifying the current demand signals such that the torque applied by one or more lanes increases and the torque applied by one or more of the other lanes decreases by an equal and opposite amount, and
applying current waveforms to the two lanes in accordance with the modified current demand signals.

* * * * *